(12) United States Patent
Choi et al.

(10) Patent No.: US 7,489,686 B2
(45) Date of Patent: Feb. 10, 2009

(54) OPTICAL NETWORK UNIT FOR AN ACCESS NETWORK EMPLOYING IEEE 1394

(75) Inventors: Do-In Choi, Yongin-si (KR); Yun-Je Oh, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 681 days.

(21) Appl. No.: 10/942,239

(22) Filed: Sep. 16, 2004

(65) Prior Publication Data

US 2005/0207398 A1    Sep. 22, 2005

(30) Foreign Application Priority Data

Mar. 16, 2004   (KR)   .................. 10-2004-0017685

(51) Int. Cl.
*H04L 12/56* (2006.01)
(52) U.S. Cl. .............. 370/391; 370/401; 725/109; 725/119; 725/148
(58) Field of Classification Search .............. None
See application file for complete search history.

(56) References Cited

U.S. PATENT DOCUMENTS

| | | | |
|---|---|---|---|
| 6,188,687 B1 * | 2/2001 | Mussman et al. | 370/388 |
| 6,505,255 B1 * | 1/2003 | Akatsu et al. | 709/239 |
| 6,510,152 B1 * | 1/2003 | Gerszberg et al. | 370/352 |
| 6,778,550 B1 * | 8/2004 | Blahut | 370/443 |
| 7,002,986 B1 * | 2/2006 | Roberts | 370/465 |
| 2003/0137975 A1 * | 7/2003 | Song et al. | 370/353 |
| 2004/0133920 A1 * | 7/2004 | Kim et al. | 725/129 |
| 2004/0184806 A1 * | 9/2004 | Lee et al. | 398/79 |

* cited by examiner

*Primary Examiner*—Wing F Chan
*Assistant Examiner*—Brian Roberts
(74) *Attorney, Agent, or Firm*—Cha & Reiter, LLC (57) ABSTRACT

Disclosed is an optical network unit of an access network for converging broadcast/telecommunication by employing IEEE 1394. The optical network unit processes the broadcast data and the communication data delivered from the optical line terminal according to each corresponding subscriber and delivering the broadcast data and the communication data to each corresponding subscriber. Furthermore, the optical network unit includes a synchronous optical network (SONET) demultiplexer for receiving the broadcast data from the optical line terminal to demultiplex the broadcast data according to each broadcast channel, a broadcast switch part for switching data of each broadcast channel, demultiplexed by the synchronous optical network (SONET) demultiplexer, according to each subscriber unit to deliver the data to each subscriber unit, an Internet protocol (IP) control part for receiving the communication data from the optical line terminal, a main control part for controlling switching with respect to the data according to each channel of each subscriber unit in the broadcast switch part and delivering the communication data from the IP control part to each subscriber unit, a 1394 link layer controller/physical layer controller for converting the data of each broadcast channel delivered from the broadcast switch part and the communication data from the main control part into data of an IEEE 1394 format to deliver the data of the IEEE 1394 format, and an optical transmitting/receiving part for performing optical transmission together with the subscriber units.

15 Claims, 6 Drawing Sheets

OPTICAL NETWORK UNIT FOR AN ACCESS NETWORK EMPLOYING IEEE 1394

CLAIM OF PRIORITY

This application claims priority to an application entitled "Optical network unit of access network employing IEEE 1394," filed in the Korean Intellectual Property Office on Mar. 16, 2004 and assigned Ser. No. 2004-17685, the contents of which are hereby incorporated by reference.

BACKGROUND OF THE INVENTION

1. Field of the Invention

The present invention relates to a broadcasting/telecommunication convergence system, and more particularly to an optical network unit for an access network.

2. Description of the Related Art

Currently, telecommunication and broadcast subscribers use data services, such as ultra-high speed Internet services, through an asymmetric digital subscriber line (ADSL), a very high bit-rate digital subscriber line (VDSL), an Ethernet local area network (Ethernet LAN), or a cable modem. Such subscribers can access broadcast services through cable broadcasts and satellite broadcasts based on a hybrid fiber coaxial (HFC). This, however, means that the subscribers employ mutually different media in order to use telecommunication and broadcast services. It is noted that the data rates of the telecommunication services are several Mb/s.

Accordingly, it is necessary to employ an FTTH system connected to a home through optical fiber in order to provide subscribers with both high speed and large capacity communication and broadcast services by overcoming limits of a conventional technique. Such FTTH systems for providing such high speed and large capacity communication and broadcast services are classified into passive optical networks (PONs) and active optical networks (AONs).

The above-mentioned conventional technique for an access network is mainly achieved through being based on either an ATM network or an Ethernet network. In particular, the ATM network has a transmission advantage suitable for broadcast. Recently, a transmission method such as an ATM passive optical network (APON), which merges an ATM technique with an access network, has been developed. However, the ATM technique indispensably employs a high-priced ATM switch. For this reason, it is difficult to construct a low-priced access network. Also, although an Ethernet technique may ensure relatively low-priced access networks, it may lower quality of service (QoS) for broadcast data.

Figure 1:
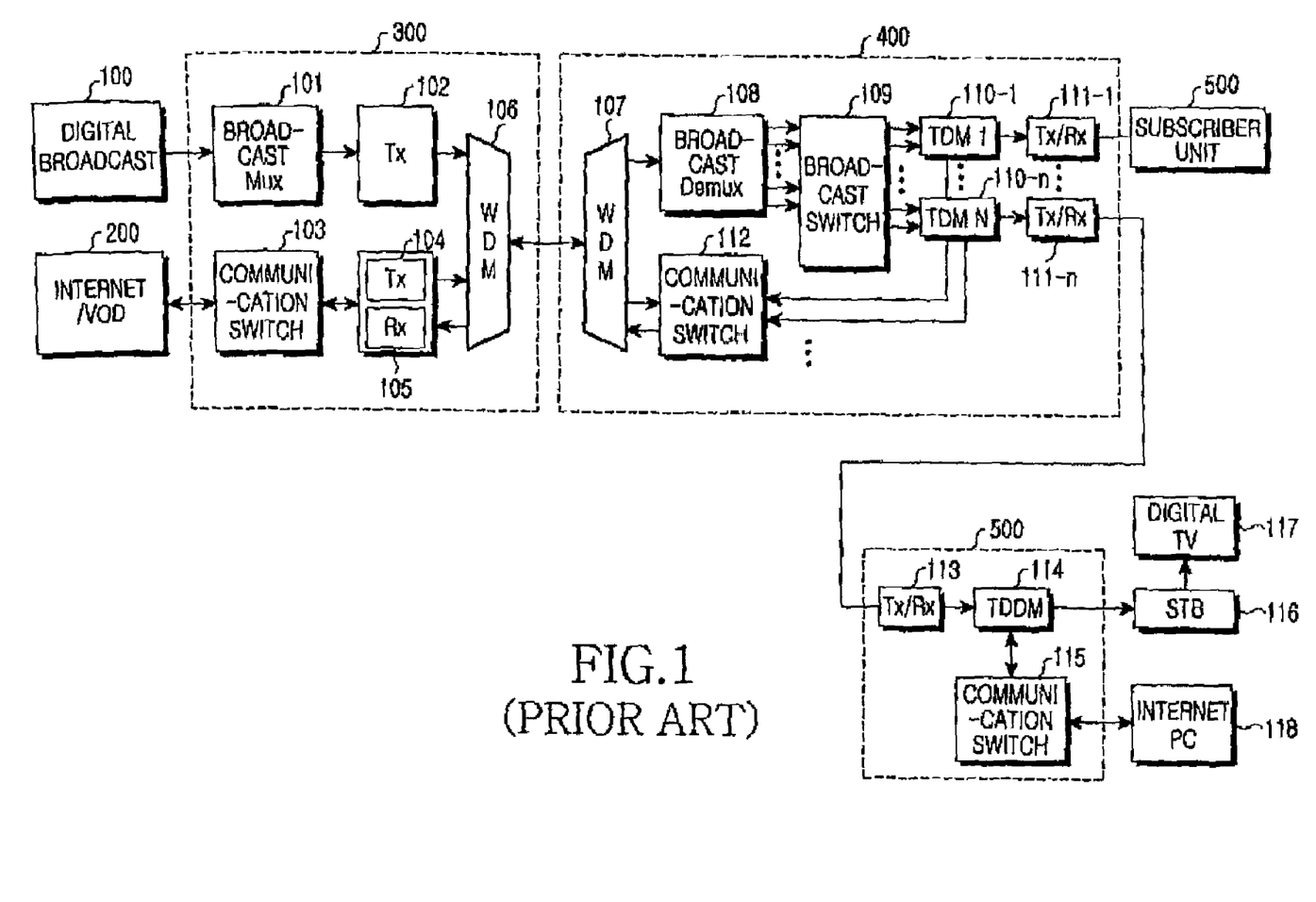
FIG. 1 is a diagram showing the structure of a broadcast/telecommunication FTTH system using TDM.

A conventional broadcast/telecommunication convergence fiber to the home (FTTH) system using time divisional multiplexing (TDM) as shown in FIG. 1 has been proposed to converge broadcast and telecommunication. The broadcast/telecommunication convergence FTTH system shown in FIG. 1 includes an optical line terminal (OLT) 300, an optical network unit (ONU) 400, and a gateway 500.

Components for converging broadcast and telecommunication perform the following operations.

The OLT 300 receives information of a digital broadcast 100 through an external broadcast network and information of external data communication (VOD, Internet, etc.) 200. The received signals are electro-optically converted into optical signals and are transferred through optical wavelength division multiplexing (optical WDM).

The ONU 400 receives the WDM optical signals from the OLT 300. The WDM signals are opto-electrically converted after WDM demultiplexing the WDM optical signals into broadcast signals and communication signals. The ONU 400 processes upstream information delivered from users to transfer the broadcast signals and communication signals selected by each user by performing time division multiplexing with respect to the broadcast signals and communication signals.

The gateway 500 performs time division demultiplexing (TDDM) with respect to the time division multiplexed signals delivered from the ONU 400 to divide the time division multiplexed signals into signals of each service. In addition, the gateway optically transfers upstream information from a user to the ONU 400.

In more detail, the OLT 300 includes a broadcast multiplexer (Mux) 101 for receiving and multiplexing digital broadcasts, an optical transmitting unit 102 for converting the multiplexed digital broadcast into optical signals, and a communication switch 103, which receives signals from an Internet/VOD (video on demand) 200 to perform switching downwardly and switches upward communication signals from each subscriber to the Internet/VOD 200 network. The OLT 300 also includes an optical receiving unit 105 for receiving upward optical signals to convert the received upward optical signals into electrical signals, and a wavelength divisional multiplex (WDM) 106 for wavelength divisional multiplexing with respect to signals so as to transfer the signals.

The ONU 400 includes a wavelength divisional demultiplexer 107 for dividing optical signals delivered from the OLT 300 into broadcast signals and communication signals, a broadcast demultiplexer (demux) 108 for dividing the broadcast signals divided by means of the wavelength divisional demultiplexer 107 into signals of each broadcast channel, and a broadcast switch 109 for switching the divided signals input into each broadcast channel according to selection of subscribers. The ONU 400 also includes a communication switch 112 for switching downstream communication signals divided by means of the wavelength divisional demultiplexer 107 according to the subscribers and for delivering upstream communication signals received from subscribers to the OLT 300, time divisional multiplexers (TDMs) 110-1 to 110-$n$ for performing time divisional multiplex with respect to the broadcast signals and the communication signals switched according to the subscribers, and optical transmitting/receiving units 111-1 to 111-$n$ for delivering the broadcast signals and communication signals multiplexed by means of the TDMs 110-1 to 110-$n$ to the subscribers (gateways) and for delivering upstream signals from subscribers to the communication switch 112 through the TDMs 110-1 to 110-$n$.

In addition, each gateway 500 includes a transmitting/receiving unit 113 for receiving downstream signals from the ONU 400 and for transmitting upstream signals to the ONU 400, and a time divisional demultiplexer (TDDM) 114 for dividing the time divisional multiplexed broadcast signals and communication signals into communication signals and broadcast signals. The gateway 500 also includes a communication switch 115 for receiving the communication signals from the TDDM 114 to deliver the communication signals to communication units, such as an Internet/PC 118 of a subscriber, and for delivering upstream signals from the communication units such as an Internet/PC 118 of the subscriber, etc., to the ONU 400.

In this regard, each subscriber watches a digital TV 117 by decoding the broadcast signals delivered from the TDDM 114 through a set top box (STB) 116 and can access to a network by transmitting/receiving communication signals by means of the Internet/PC 118 of a subscriber.

However, according to the conventional broadcast/telecommunication convergence FTTH system, the broadcast signals and the communication signals, which are time division multiplexed, are delivered for a connection between the ONU 400 and the gateway 500. The time division multiplexed broadcast signals and communication signals are then demultiplexed. The conventional broadcast/telecommunication convergence FTTH system causes fault to parts having multi-channels of the broadcast signals and parts receiving broadband communication signals.

In more detail, the conventional broadcast/telecommunication convergence FTTH system employs a TDM method, which transmits signals from the ONU 400 to the gateway 500 of a subscriber side by combining communication signals (e.g., Ethernet data) with broadcast signal selected by a subscriber in one time frame. The time frame is created through a field programmable gate array (FPGA). The FPGA only receives Ethernet signals having a data rate of about 100 Mbps and two-channel high definition (HD) broadcast signals in maximum because the FPGA has a limitation for processing data. In particular, the FPGA is designed to receive broadcast signals having a fixed length.

It cannot, however, provide broadcast signals in accordance with various standards (e.g., broadcast signals having different wavelengths) or broadcast signals having more than three channels even if a subscriber requests the broadcast signals.

In addition, the broadcast switch 109 provided in the broadcast/telecommunication convergence FTTH system shown in FIG. 1 includes two cross point switches coupled with each other.

The broadcast/telecommunication convergence FTTH system branches serialized MPEG2 transport streams (TSs) into two MPEG2 TSs, selects a TS having a program required by a subscriber by using the two cross point switches, and combines the two MPEG2 TSs into one stream in a TDM module. As a result, two programs required by a subscriber can be transferred through the above-described procedure.

However, such a method for transferring two MPEG TSs required by a subscriber through a TDM mode is problematic because the number of video screen images for one subscriber is fixed according to the number of ports of the broadcast switch 109 assigned to the subscriber and the number of input streams specified through FPGA for the TDM. Accordingly, it is not possible for a network administrator to flexibly manage a system according to various requirements of subscribers.

In addition, in order to improve transmission efficiency when transferring broadcast data, an upper-class network must transfer the broadcast data by combining each MPEG2 TS including a plurality of programs into one multi-program transport stream (MPTS). The MPTS created as described above has a bit rate varied depending on service media, such as a digital media center (DMC), a satellite, a terrestrial broadcasting, etc., and service methods thereof. Thus, it is not possible to apply the MPTS to a TDM method, which outputs data with a constant bit rate by requesting a fixed input data bit rate. To solve the above-mentioned problem, it is necessary to install a plurality of expensive MPEG REMUX apparatuses.

SUMMARY OF THE INVENTION

One aspect of the present invention relates to an optical network unit for an access network employing IEEE 1394, which can provide broadcast having various channels by converging broadcast and telecommunication to transfer the converged broadcast and telecommunication by using an IEEE 1394 transmitting method, which is a standard interface in a broadcast/telecommunication convergence FTTH system.

Another aspect of the present invention relates to an optical network unit for an access network employing IEEE 1394, which can provide signals of variable bands by transferring data through an IEEE 1394 method.

Yet another aspect of the present invention relates to an optical network unit for an access network employing IEEE 1394, which can increase switching capacity by performing a memory-switching instead of a physical-switching.

One embodiment of the present invention is directed to an optical network unit for an access network for converging broadcast/telecommunication by employing IEEE 1394. The optical network unit includes an optical line terminal for delivering a plurality of broadcast data and communication data transmitted thereto through external broadcast and communication vendors and a plurality of subscriber units for receiving the broadcast data and the communication data processed for each subscriber from the optical network unit. The optical network unit processes the broadcast data and the communication data delivered from the optical line terminal according to each corresponding subscriber and delivers the broadcast data and the communication data to each corresponding subscriber. The optical network unit includes a synchronous optical network (SONET) demultiplexer for receiving the broadcast data from the optical line terminal to demultiplex the broadcast data according to each broadcast channel, a broadcast switch part for switching data of each broadcast channel, demultiplexed by the synchronous optical network (SONET) demultiplexer, according to each subscriber unit to deliver the data to each subscriber unit, and an Internet protocol (IP) control part for receiving the communication data from the optical line terminal. The optical network unit also includes a main control part for controlling switching with respect to the data according to each channel of each subscriber unit in the broadcast switch part and delivering the communication data from the IP control part to each subscriber unit, a 1394 link layer controller/physical layer controller for converting the data of each broadcast channel delivered from the broadcast switch part and the communication data from the main control part into data of an IEEE 1394 format to deliver the data of the IEEE 1394 format and an optical transmitting/receiving part for performing optical transmission together with the subscriber units.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments of the present invention will be described in detail with reference to the accompanying drawings. Note that the same or similar components in drawings are designated by the same reference numerals as far as possible although they are shown in different drawings. For the purposes of clarity and simplicity, a detailed description of known functions and configurations incorporated herein will be omitted as it may obscure the subject matter of the present invention.

First, an explanation relating to IEEE 1394 will be provided. The IEEE 1394 is a serial bus interface standard. The IEEE 1394, which has been researched since 1986, was publicly issued and standardized by the Institute of Electrical and Electronics Engineers (IEEE) in December, 1995.

When processing isochronous data (isochronous data-AV stream data), which are mainly used for transmitting multimedia information, and asynchronous data (asynchronous data-control and packet data), which are used for communication and for transmitting control information, system compliant with the IEEE 1394 standard have a serial bus interface capable of connecting a maximum of 63 nodes and gives priority to the isochronous data. The IEEE 1394 may be used to improve QoS for multimedia data used in a home network. In addition, IEEE 1394a suggests bit rates of s100, s200, and s400 and a recently-issued IEEE 1394b specification suggests optical media such as a POF (plastic optical fiber), an SMF (single mode fiber), an MMF (multi-mode fiber), etc., so that a high speed of 3.2 Gbps is guaranteed. In this regard, the IEE 1394 standard is expected to provide an efficient solution for the home network and remote data communications.

An FTTH system according to one embodiment of the present invention is designed to employ an MMF or an SMF as a transmission medium and a low-priced light source in addition to the IEEE 1394b standard.

The low-priced light source can be selected on the basis of transmission distance, transmission speed, and price. For instance, a small form factor pluggable (SFP) used for a conventional FTTH system stands for the low-priced light source. When utilizing the MMF as a transmission medium together with the SFP having an output wavelength of 850 nm, it is possible to transfer data within a maximum distance of about 3 km with a data rate of about 1.25 Gbps. Accordingly, since the FTTH system is designed such that a distance from the ONU 400 of the FTTH system to the subscriber unit 500 is within a range of about 1 km to 2 km, the FTTH system employing the IEEE 1394 can utilize the SFP as the light source.

Also, the currently available IEEE 1394b provides a maximum data rate of about 800 Mbps. The IEEE 1394b standard suggests a data rate of about 3.2 Gbps. Accordingly, transmission capacity of a future FTTH system may be improved by using the IEEE 1394.

Figure 2:
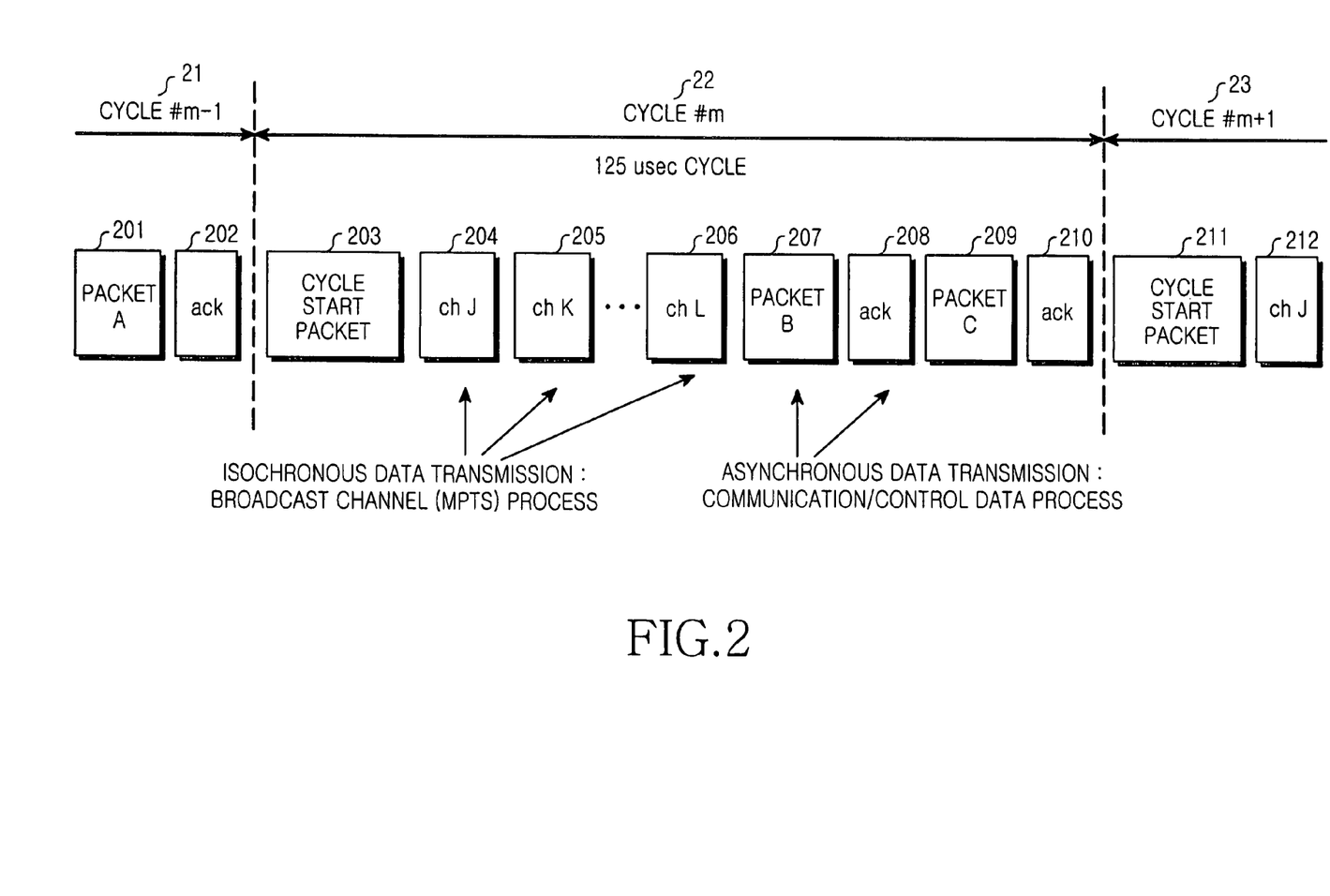
FIG. 2 a diagram showing data transmission of IEEE 1394 according to one embodiment of the present invention.

FIG. 2 is a view showing data transmission of the IEEE 1394 according to one aspect of the present invention.

Generally, in the IEEE 1394, a basic one cycle, as shown in FIG. 2 with reference numerals 21 to 23, respectively, is 125 μs. A transfer layer is defined in a multiple format, such as s100, s200, s400, s800, s1600, or s3200. Also, one cycle includes isochronous data sections 204, 205 and 206, or 212 occupying 80% of one cycle and asynchronous data sections 201 and 202 or 207, 208, 209 and 210 occupying 20% to 100% of one cycle. Also, each of cycle start packets 203 and 211 is positioned at the start point of each cycle 21 to 23 so as to report the start of a new cycle.

Since the isochronous data sections are transmitted through a transmission manner suitable for transmitting multimedia data by primarily considering transmission time, the isochronous data sections are transferred prior to the asynchronous data sections. In contrast, the asynchronous data have at least 20% of resources and are transferred by considering transmission quality.

In one embodiment of the present invention, broadcast signals are assigned to the isochronous data sections, and communication signals (zapping, NMS/EMS, etc.) are assigned to the asynchronous data sections, so that it is possible to perform broadcast/telecommunication convergence transmission such as time divisional multiplex in the conventional FTTH system.

Also, multi-channels are provided by considering that a plurality of isochronous channels 204, 205, and 206 can be accommodated in a transmission cycle of 125 μs in the IEEE 1394. When designing an FTTH system having maximum transmission capacity of 400 Mbps, if the asynchronous data sections having a data rate of 100 Mbps are assigned for Ethernet, isochronous channels may be provided with various lengths and capacity of 300 Mbps in maximum.

For example, in case of fixed-length broadcast channels having a data rate of 500 Mbps, a maximum of six broadcast channels can be provided. When the broadcast channels have a data rate of 27 Mbps, 11 broadcast channels can be transferred for one subscriber. Also, it is possible to transfer the broadcast channels corresponding to various broadcast formats by varying the length of each isochronous packet. Theoretically, a maximum of 64 isochronous channels can be provided.

Figure 3:
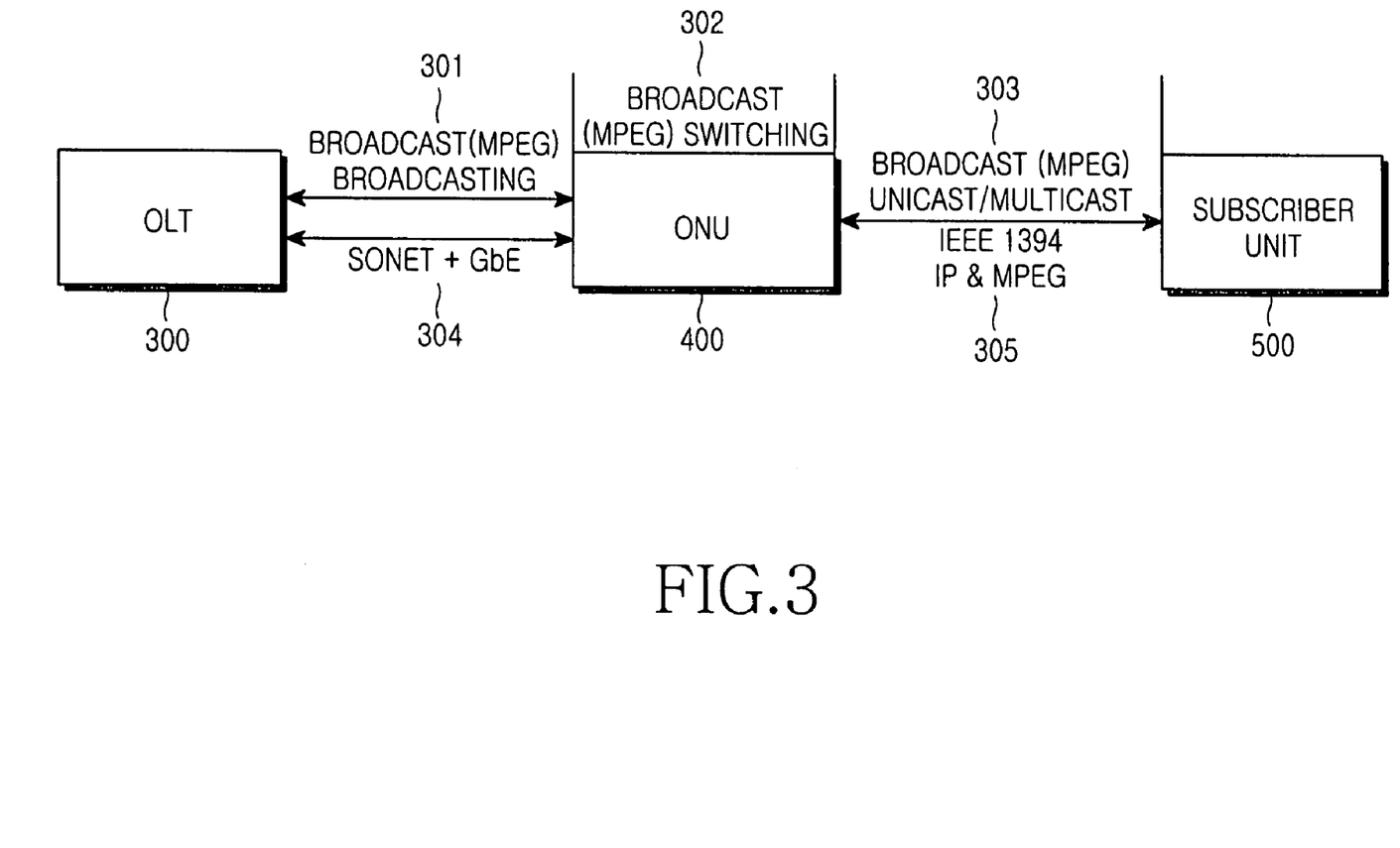
FIG. 3 is a diagram showing the structure of an access network employing IEEE 1394 according to one embodiment of the present invention.

FIG. 3 is a diagram showing the structure of an access network employing the IEEE 1394 according to an embodiment of the present invention.

As shown in FIG. 3, the access network employing the IEEE 1394 includes an OLT 300, which is installed for example in a telephone office or a base station. and the access network is also equipped with a head end unit, an ONU 400, which is installed for example at a control office of an apartment building, etc., and transmits data to a subscriber unit 500. The subscriber unit 500, which may be located at a subscriber-home provides services to each respective subscriber.

The following is a description of a transmission procedure for broadcast data and communication data according to another embodiment of the present invention with reference to FIG. 3.

First, all broadcast data between the OLT 300 and the ONU 400 are broadcasted using an MPTS format (step 301). Also, the communication data of an IP format between the OLT 300 and the ONU 400 are transferred through a gigabit Ethernet. The broadcast data between the OLT 300 and the ONU 400 may be broadcasted through a SONET, and the communication data may be transferred through the gigabit Ethernet. The above description is similarly applied to the conventional FTTH system described with reference to FIG. 1.

The ONU 400 performs switching with respect to delivered broadcast data (step 302) and processes the switched broadcast data and the switched communication data as IEEE 1394 data.

In addition, the broadcast data and the communication data having an IP mode are transferred in the form of an IEEE 1394 between the ONU 400 and the subscriber unit 500 (step 305). At this time, the broadcast data is uni-cast or multi-cast between the ONU 400 and the subscriber unit 500 through a broadcast switching of the ONU 400 (steps 302 and 303).

Figure 4:
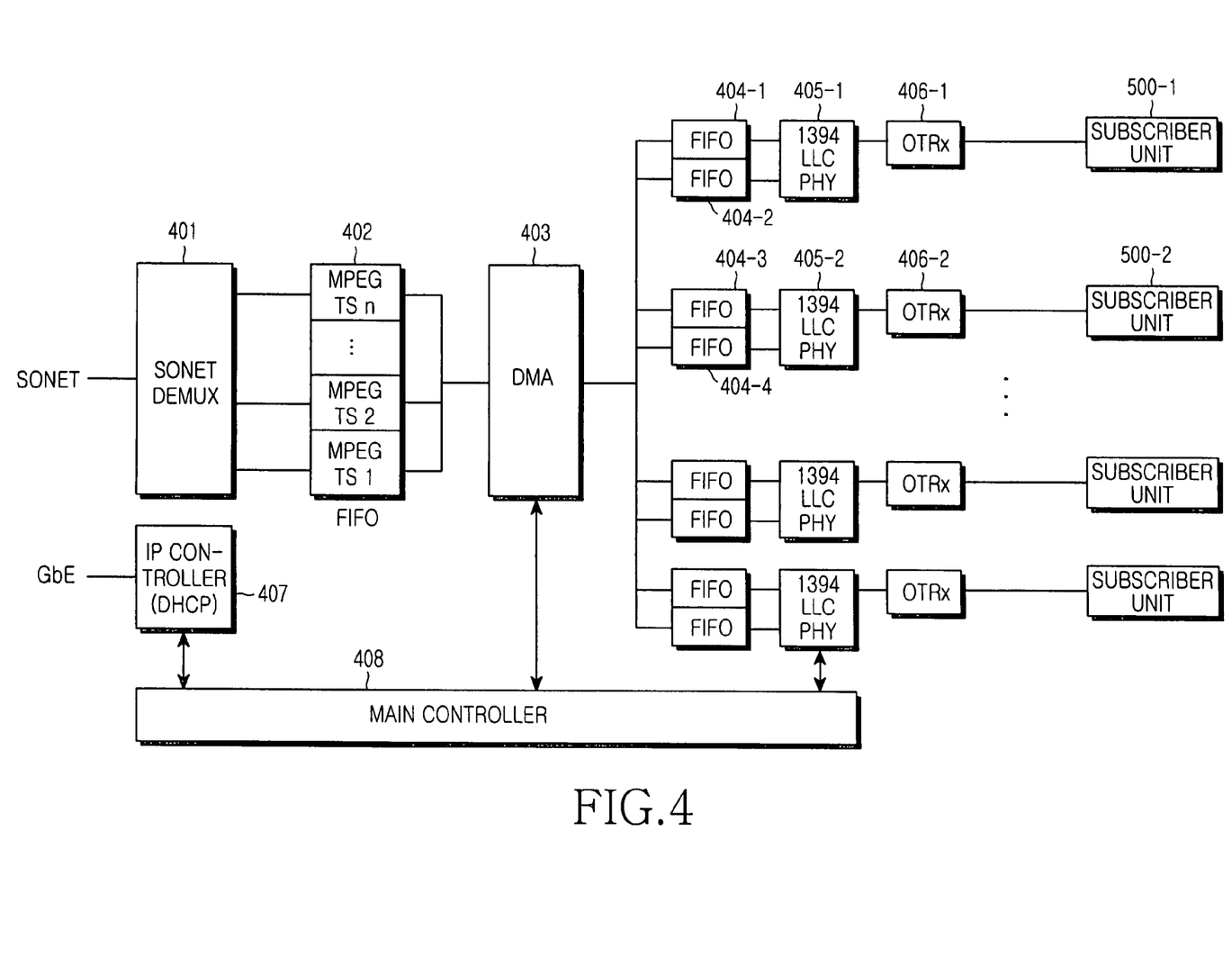
FIG. 4 is a diagram showing an optical network unit (ONU) structure of an access network employing IEEE 1394 according to one embodiment of the present invention.

FIG. 4 is a diagram showing an optical network unit (ONU) structure of the access network employing the IEEE 1394. Broadcast data and communication data input through a SONET demultiplexer 401 and an IP control part 407, respectively, have been transferred as one optical signal from the OLT 300 and have been divided through wavelength divisional multiplexing, which are not shown in FIG. 4.

As shown in FIG. 4, the optical network unit includes the SONET demultiplexer 401 for receiving the broadcast data from the OLT 300 to demultiplex the broadcast data according to each broadcast channel, a first FIFO (first in first out) buffer 402 for performing buffering with respect to data of each broadcast channel, and a direct memory access (DMA) part 403 for performing switching with respect to the broadcast data through a memory access. The optical network unit also includes second FIFO buffers 404-1 to 404-4 for performing buffering with respect to the broadcast data of each channel selected by each subscriber, an IP control part 407 for receiving the communication data from the OLT 300 through the gigabit Ethernet, and a main control part 408 for controlling switching achieved by the DMA part 403 for broadcast channel data of each subscriber unit and for delivering the communication data from the IP control part 407 in order to transfer the communication data from the IP control part 407 as data of the IEEE 1394 format. The optical network unit further includes 1394 link layer controllers (LLCs)/physical layer controllers (PHYs) 405-1 and 405-2 for converting switched broadcast data of each channel from the second FIFO buffers 404-1 to 404-4 and the communication data from the main control part 408 into data of the IEEE 1394 format, and optical transmitting/receiving parts 406-1 and 406-2 for optically transferring data to subscriber units 500-1 and 500-2.

In more detail, the broadcast data transferred from the OLT 300 in a SONET format are demultiplexed by the SONET demultiplexer 401 and divided into a plurality of MPEG TSs. The divided MPEG TSs may have mutually different bit rates. Also, each of the divided MPEG TSs may be an MPTS including several single program transport streams (STPSs) of an SD level or a single STPS of an HD level. Regarding the MPTS described above, program information included in each MPTS can be found with reference to a program access table (PAT). However, the OLT 300 obtains the program information though IP data in advance in order to simplify a structure and to reduce a cost for the ONU.

As described above, each demultiplexed MPEG TS must be switched such that only data of a channel required by each subscriber unit 500 are transferred.

In one embodiment of the present invention, the high-speed DMA part 403 is used for performing switching with respect to the broadcast data. Accordingly, buffering must be performed for each demultiplexed MPEG TS before each demultiplexed MPEG TS is input to the DMA 403. To accomplish this, the ONU includes the first FIFO buffer 402 capable of processing n number of MPEG TSs.

Also, the DMA part 403 receives channel selection information, which is a selection signal for a channel required by each subscriber and delivered from each subscriber unit 500, through the main control part 408 to perform switching through a high-speed DMA operation.

In addition, MPEG TS data switched through the DMA part 403 is input to the 1394 LLCs/PHYs 405-1 and 405-2 through the asynchronous FIFO buffers 404-1 to 404-4. The asynchronous FIFO buffers 404-1 to 404-4 are used for providing MPEG TSs having mutually different bit rates.

The 1394 LLCs/PHYs 405-1 and 405-2 convert the broadcast data and the communication data into IEEE 1394 data having the IEEE 1394 data format. The broadcast data is delivered to the 1394 LLCs/PHYs 405-1 and 405-2 through the second FIFO buffers 404-1 to 404-4, and the communication data is delivered to the 1394 LLCs/PHYs 405-1 and 405-2 through the IP control part 407 and the main control part 408.

The IEEE 1394 data converted by the 1394 LLCs/PHYs 405-1 and 405-2 is delivered to the subscriber units 500-1 and 500-2 through the optical transmitting/receiving parts 406-1 and 406-2.

Meanwhile, channel selection information of the subscriber units 500-1 and 500-2 delivered through the subscriber units 500-1 and 500-2 is received through the optical transmitting/receiving parts 406-1 and 406-2 and delivered from the 1394 LLCs/PHYs 405-1 and 405-2 to the main control part 408.

Figure 5:
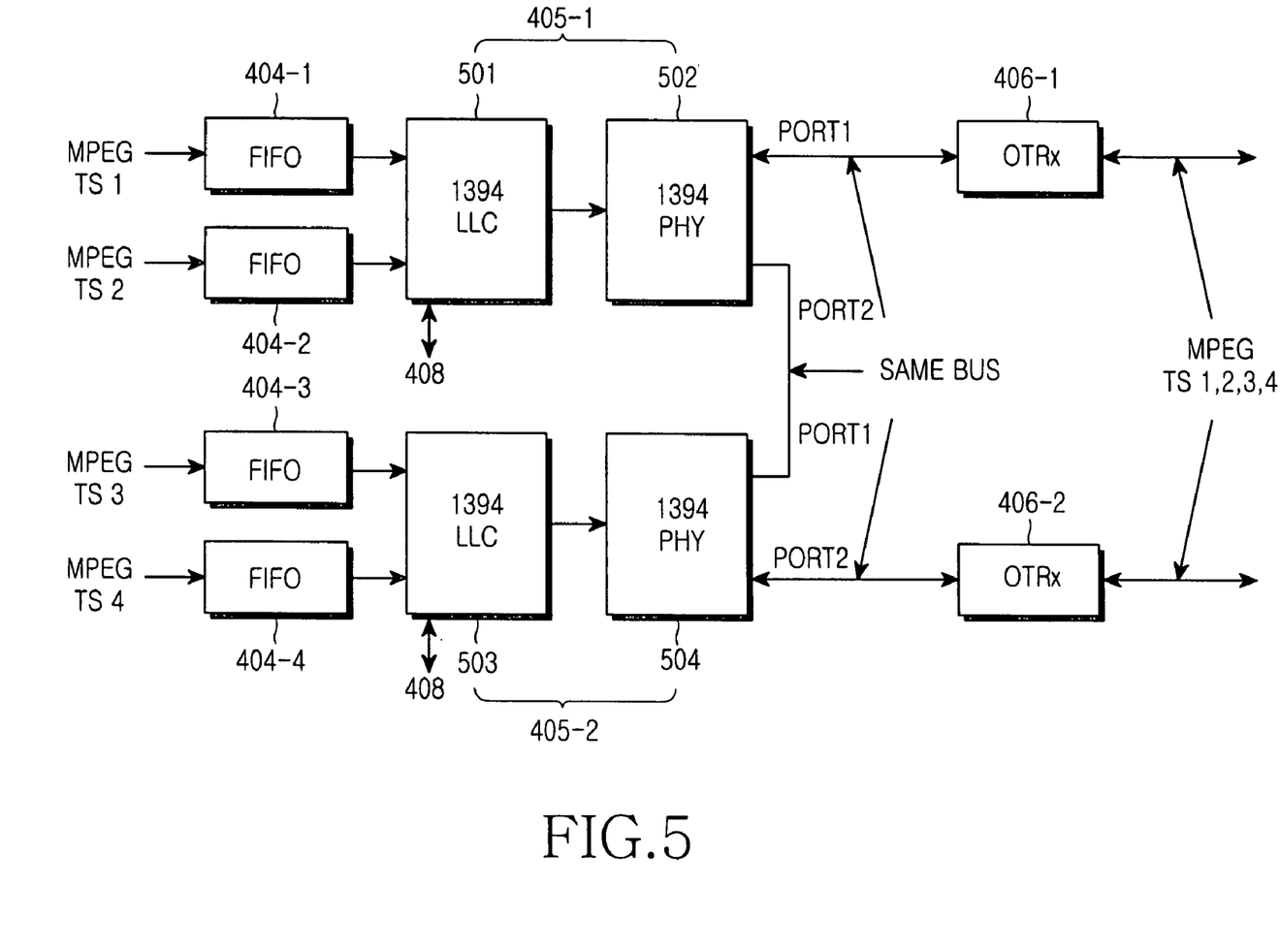
FIG. 5 is a detailed diagram showing units for processing IEEE 1394 in an optical network unit of an access network employing IEEE 1394 according to one embodiment of the present invention.

FIG. 5 is a detailed diagram showing units for processing the IEEE 1394 in the ONU 400.

As shown in FIG. 5, the units for processing the IEEE 1394 in the ONU 400 include the first FIFO buffers 404-1 to 404-4 for performing buffering with respect to the broadcast data of channels selected by the subscriber unit as shown in FIG. 4, the 1394 LLCs/PHYs 405-1 and 405-2 for converting the communication data delivered from the main control part 408 and the broadcast data of channels switched from the first FIFO buffers 404-1 to 404-4 into data having the IEEE 1394 format, and the optical transmitting/receiving parts (OTRxs) 406-1 and 406-2 for optically transferring data to the subscriber units 500-1 and 500-2.

A detailed description concerning the 1394 LLCs/PHYs 405-1 and 405-2, 1394 LLCs 501 and 503 and 1394 PHYs 502 and 504 of the 1394 LLCs/PHYs 405-1 and 405-2 will be separately described below.

Now the operations of the units for processing the IEEE 1394 in the ONU 400 will be described.

First, the MPEG TS data (MPEG TS 1 to MPEG TS4) switched through the DMA part 403 is input to the 1394 LLCs 501 and 503 through the asynchronous FIFO buffers 404-1 to 404-4. The 1394 LLCs 501 and 503 receive communication data through the main control part 408. As described above, the 1394 LLCs 501 and 503 convert the broadcast data (MPEG TS data) switched by each subscriber and the communication data into data having the IEEE 1394 format to deliver the converted data to the 1394 PHYs 502 and 504. The 1394 LLCs 501 and 503 convert data having the IEEE 1394 format including channel selection information of the subscriber units delivered through the 1394 PHYs 502 and 504 into data having the IP format to deliver the converted data to the main control part 408.

In addition, the 1394 PHYs 502 and 504 are used for performing interface with respect to data having the IEEE 1394 format and connect the 1394 LLCs 501 and 503 to the optical transmitting/receiving units 406-1 and 406-2. The 1394 PHYs 502 and 504 share ports with their neighbor 1394 PHYs, so that each of 1394 PHYs 502 and 504 combines each input data with each input data to output the combined input data. The 1394 PHY 502, which has received MPEG TSs 1 and 2, and the 1394 PHY 504, which has received MPEG TSs 3 and 4, output MPEG TSs 1 to 4 through a first output port of the 1394 PHY 502 and a second port of the 1394 PHY 504 by sharing a second port of the 1394 PHY 502 and a first port of the 1394 PHY 504 with each other. In other words, the 1394 PHYs 502 and 504 shares one port with the 1394 PHYs 502 and 504, so that the same bus is used for each shared port. Accordingly, the number of MPEG TSs to be transferred to each home is doubled.

Meanwhile, channel selection information of subscriber units 500-1 and 500-2, delivered through the subscriber units 500-1 and 500-2, is received by the optical transmitting/receiving parts 406-1 and 406-2 to be delivered to the main control part 408 from the 1394 LLCs/PHYs 405-1 and 405-2.

It is necessary to convert communication data having the IP format into data having the IEEE 1394 format. To do this an IP over 1394 standard recommendation may be employed. However, a structure for sequentially transferring IP data from an ONU to a final terminal unit of a subscriber by only using a 1394 frame is required. Since algorithms, such as TCP/IP, etc., are not required in the process of an intermediate procedure before IP is finally processed by a unit, such as a PC (personal computer), seamless IP transmission must be performed.

Figure 6:
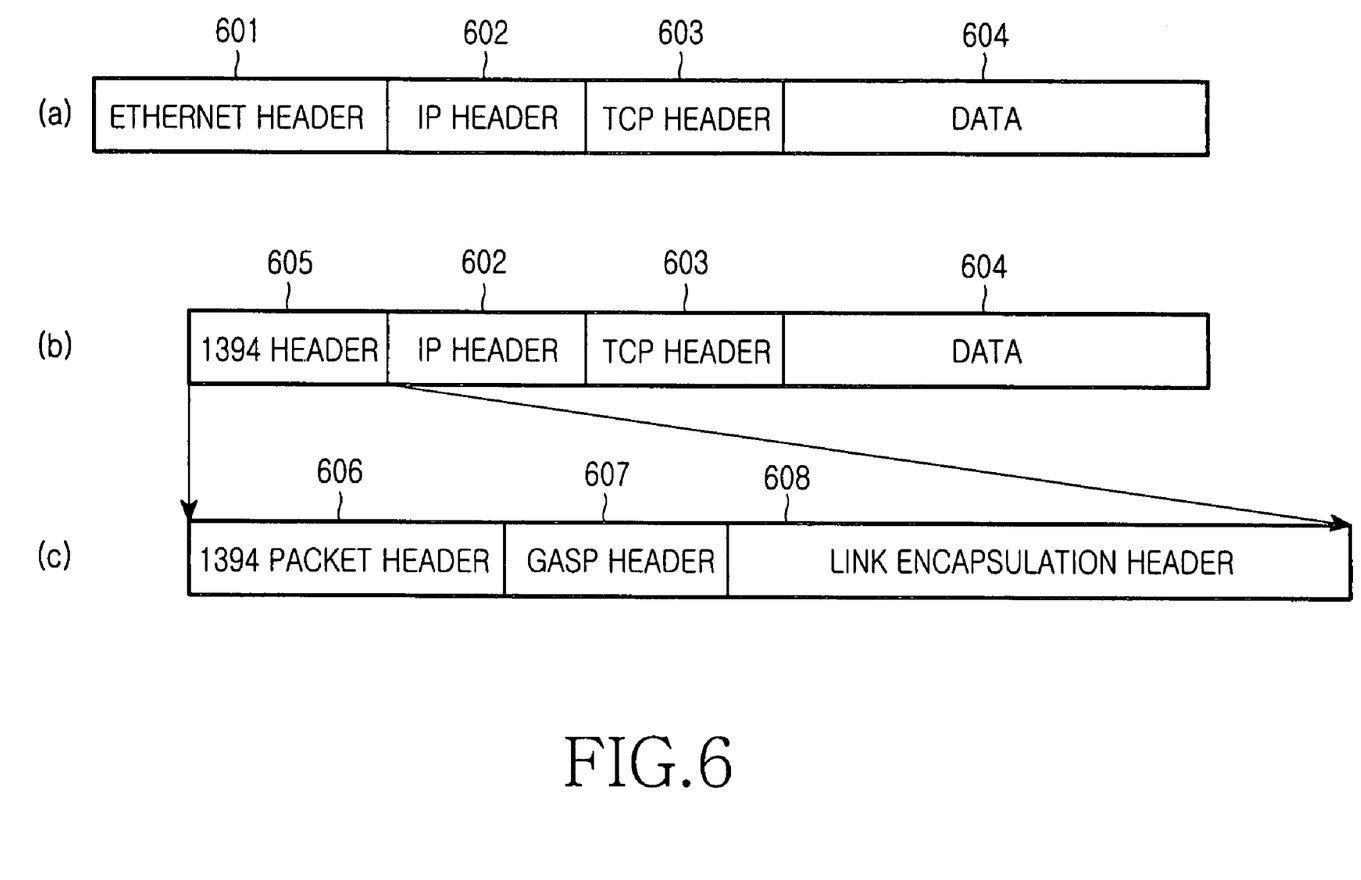
FIGS. 6a to 6c are diagrams showing seamless IP data transmission according to one embodiment of the present invention.

FIGS. 6a to 6c show an example of seamless IP data transmission.

FIG. 6a shows a typical Ethernet data format. As shown in FIG. 6a, a typical Ethernet data includes an Ethernet header 601, an IP header 602, a TCP header 603, and data 604 for transmission.

In order to convert the general Ethernet data into IEEE 1394 data for the seamless IP transmission, the Ethernet header is changed into the 1394 header 605 and remaining Ethernet data is transferred without being changed as shown in FIG. 6b.

Also, FIG. 6c shows contents of the 1394 header. The 1394 header includes a 1394 packet header 606, a GASP header 607, and a link encapsulation header 608.

Since a node address of the IEEE 1394 is used instead of an Ethernet media access control address as shown in FIGS. 6a to 6c, it is necessary to perform an address resolution protocol (ARP) procedure between an IP address and a 1394 node address in a place at which a plurality of 1394 nodes excluding PtP exist. The ARP procedure is performed by changing the Ethernet Header 601 into the 1394 header 605.

As described above, it is possible to provide broadcast having various channels by employing an IEEE 1394 transmission method, which is a standard interface, to converge broadcast/telecommunication and transfer the broadcast/telecommunication in a broadcast/telecommunication convergence FTTH system.

Also, it is possible to process signals of a variable band by transferring data through an IEEE 1394 method.

In addition, it is possible to increase switch capacity by performing switching through a memory-switch instead of physical-switch.

Various methods as described above may be embodied as computer programs, so that the methods can be stored in a recording medium, such as a CD ROM, a RAM, a floppy disc, a hard disc, and a magneto-optic disc, such that the methods can be read out by a computer.

While the invention has been shown and described with reference to certain embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. An optical network unit for an access network for converging broadcast/telecommunication, the optical network unit including an optical line terminal for delivering a plurality of broadcast data and communication data transmitted thereto through external broadcast and communication vendors and a plurality of subscriber units for receiving the broadcast data and the communication data processed for each subscriber from the optical network unit, the optical network unit for processing the broadcast data and the communication data delivered from the optical line terminal according to each corresponding subscriber and delivering the broadcast data and the communication data to each corresponding subscriber, the optical network unit comprising:

a synchronous optical network (SONET) demultiplexer for receiving the broadcast data from the optical line terminal to demultiplex the broadcast data according to each broadcast channel having respectively different bit rates;

a broadcast switch part for switching each broadcast channel, demultiplexed by the synchronous optical network (SONET) demultiplexer, in consideration of the bit rate of each broadcast data, according to each subscriber unit to deliver the broadcast data to each subscriber unit;

an Internet protocol (IP) control part for receiving the communication data from the optical line terminal;

a main control part for controlling switching with respect to each channel of each subscriber unit in the broadcast switch part and delivering the communication data from the IP control part to each subscriber unit;

a 1394 link layer controller/physical layer controller for converting the data of each broadcast channel delivered from the broadcast switch part and the communication data from the main control part into an IEEE 1394 format so as to deliver the data of the IEEE 1394 format; and an optical transmitting/receiving part for performing optical transmission together with the subscriber units.

2. The optical network unit as claimed in claim 1, wherein the broadcast switch part includes a first FIFO (first in first out) buffer for performing buffering with respect to the data of each broadcast channel demultiplexed through the SONET demulutplexer, a direct memory access (DMA) part for switching the data of each broadcast channel, delivered through the first FIFO buffer, through memory access, and a second FIFO buffer for performing buffering with respect to the data of each broadcast channel selected by each subscriber unit, switched through the direct memory access part, in order to output the data of each broadcast channel to the 1394 link layer controller/physical layer controller.

3. The optical network unit as claimed in claim 2, wherein the second FIFO buffer deals with broadcast data having mutually different data rates by utilizing an asynchronous mode.

4. The optical network unit as claimed in claim 2, wherein the 1394 link layer controller/physical layer controller shares an output port with neighbor physical layer controllers in order to enlarge a transmission range of broadcast data for the subscriber units.

5. The optical network unit as claimed in claim 3, wherein the 1394 link layer controller/physical layer controller shares an output port with neighbor physical layer controllers in order to enlarge a transmission range of broadcast data for the subscriber units.

6. The optical network unit as claimed in claim 1, wherein the 1394 link layer controller/physical layer controller shares an output port with neighbor physical layer controllers.

7. An optical network unit, comprising:

an optical line terminal;

a synchronous optical network (SONET) demultiplexer arranged to receive broadcast data from the optical line terminal and to demultiplex the broadcast data having respectively different bit rates according to each broadcast channel;

a broadcast switch arranged to switch each broadcast channel, demultiplexed by the synchronous optical network (SONET) demultiplexer, in consideration of the bit rate of each broadcast data, according to at least one subscriber unit to deliver the broadcast data to the subscriber unit;

an Internet protocol (IP) controller ranged to receive communication data from the optical line terminal;

a controller arranged to control switching with respect to each channel of the at least one subscriber unit in the broadcast switch and deliver the communication data from the IP control part to the at least one subscriber unit;

a 1394 link layer controller/physical layer controller arranged to convert the data of each broadcast channel delivered from the broadcast switch and the communication data from the controller into data of an IEEE 1394 format to deliver the IEEE 1394 format data; and an optical transmitter/receiver arranged to perform optical transmission with the at least one subscriber unit.

8. The optical network unit as claimed in claim 7, wherein the broadcast switch includes a first FIFO (first in first out) buffer for performing buffering with respect to the data of each broadcast channel demultiplexed through the SONET demulutplexer, a direct memory access (DMA) part for switching the data of each broadcast channel, delivered through the first FIFO buffer, through memory access, and a second FIFO buffer for performing buffering with respect to the data of each broadcast channel selected by the subscriber unit, switched through the direct memory access part, in order to output the data of each broadcast channel to the 1394 link layer controller/physical layer controller.

9. The optical network unit as claimed in claim 8, wherein the second FIFO buffer deals with broadcast data having mutually different data rates by utilizing an asynchronous mode.

10. The optical network unit as claimed in claim 9, wherein the 1394 link layer controller/physical layer controller shares an output port with neighbor physical layer controllers in order to enlarge a transmission range of broadcast data for the subscriber units.

11. The optical network unit as claimed in claim 8, wherein the 1394 link layer controller/physical layer controller shares an output port with neighbor physical layer controllers in order to enlarge a transmission range of broadcast data for the subscriber units.

12. The optical network unit as claimed in claim 7, wherein the 1394 link layer controller/physical layer controller shares an output port with neighbor physical layer controllers in order to enlarge a transmission range of broadcast data for the subscriber unit.

13. An optical network unit, comprising:
a first interface configured for receiving broadcast data having a multi-program transport stream (MPTS) format and having respectively different bit rates;

a second interface configured for receiving communication data having an IP format;

a switch controller arranged to perform switching with respect to the broadcast data and the communication data in consideration of the bit rate of each broadcast data, and a processor to process the switched broadcast data and the switched communication data into IEEE 1394 data format.

14. The optical network unit as claimed in claim 13, further comprising a third interface configured for transferring broadcast data and the communication data having an IP format as IEEE 1394 data between the optical network unit and a subscriber unit.

15. The optical network unit as claimed in claim 14, wherein the broadcast data is uni-cast or multi-cast between the optical network unit and the subscriber unit.

* * * * *